United States Patent [19]

Nishimura

[11] Patent Number: 4,940,928

[45] Date of Patent: Jul. 10, 1990

[54] CHARGING GENERATOR APPARATUS

[75] Inventor: Shinji Nishimura, Himeji, Japan

[73] Assignee: Mitsubishi Denki Kabushiki Kaisha, Tokyo, Japan

[21] Appl. No.: 387,039

[22] Filed: Jul. 31, 1989

[30] Foreign Application Priority Data

Aug. 29, 1988 [JP] Japan .................................. 63-214329

[51] Int. Cl.⁵ ............................................. H02J 7/14
[52] U.S. Cl. ......................................... 322/28; 322/73
[58] Field of Search ................... 322/22, 24, 25, 27, 322/28, 72, 73

[56] References Cited

U.S. PATENT DOCUMENTS

| | | | |
|---|---|---|---|
| 4,315,205 | 2/1982 | Mori et al. | 322/28 X |
| 4,361,796 | 11/1982 | Akita et al. | 322/28 X |
| 4,401,937 | 8/1983 | Morishita | 322/72 X |
| 4,590,415 | 5/1986 | Iwaki et al. | 322/28 X |
| 4,634,954 | 1/1987 | Kato et al. | 322/73 X |
| 4,636,706 | 1/1987 | Bowman et al. | 322/73 X |
| 4,839,576 | 6/1989 | Kaneyuki et al. | 322/28 X |

FOREIGN PATENT DOCUMENTS 169337 of 1984 Japan .

Primary Examiner—William H. Beha, Jr.
Assistant Examiner—Kristine Peckman
Attorney, Agent, or Firm—Sughrue, Mion, Zinn, Macpeak and Seas

[57] ABSTRACT

A charging generator 1 has armature windings 101 and a field winding 102, a voltage reducing circuit 5 for reducing the output voltage of the generator, a battery 4 to be charged by the output voltage of the voltage reducing circuit, a voltage regulator 31 for regulating the output of the generator by controlling a field current supplied to the field winding, and a control circuit 6 for controlling a voltage reducing ratio in the voltage reducing circuit.

4 Claims, 4 Drawing Sheets

CHARGING GENERATOR APPARATUS

BACKGROUND OF THE INVENTION

The present invention relates to a charging generator apparatus to be driven by, for instance, an engine mounted on an automobile.

FIG. 4 is a circuit diagram of a conventional charging generator apparatus, wherein a reference numeral 1 designates a generator to be actuated by an engine (not shown) which comprises armature windings 101 having a three-phase star connection and a field winding 102, a numeral 2 designates a three-phase full-wave rectifier for rectifying the a.c. output voltage of the generator 1, a numeral 3 designates a voltage regulator which detects the output voltage of the three phase full wave rectifier 2 and turns on or off a transistor 301 to thereby control a field current flowing in the field winding 102 so that the output voltage of the generator 1 is maintained to be a predetermined level, and a numeral 4 designates a battery to be charged by the output voltage of the three-phase full-wave rectifier 2.

The operation of the conventional charging generator apparatus will be described. When the generator 1 is actuated by the engine (not shown), a three-phase a.c. voltage is induced in the armature windings 101 since a field current is passed from the battery 4 through the field winding 102 and the transistor 301. The three-phase phase a.c. current is rectified by the three-phase full-wave wave rectifier 2 and charges the battery 4. When the output voltage of the generator 1 is higher than a predetermined level, the voltage regulator 3 interrupts the field current by turning off the transistor 301, whereby the output voltage of the generator 1 is reduced. Then, when the output voltage of the generator 1 is lower than the predetermined level, the voltage regulator 3 turns on the transistor 301 so that the field current is passed through the field winding 102, and the output voltage of the generator 1 is again increased. Thus, the generator 1 charges the battery 4 by a predetermined voltage.

The conventional charging generator apparatus requires a requesite number of turns of the armature windings in order to obtain a predetermined revolutional speed for initiating power generation. When the number of turns of the armature windings 101 is determined, the maximum output current at a high speed revolution is converged to a current value determined by the armature reaction as is well known. Namely, there has been known that a field current is increased by a method as disclosed, for instance, in Japanese Unexamined Patent Publication No. 285698/1987 in order to assure the ability of charging at a low speed and to obtain a high output current at a high speed revolution. In this case, the copper loss, which is known as $I^2R$, of the armature windings is increased in proportion to the square of the output current when the output current is increased. This causes a large temperature rise, resulting in the lack of reliability.

SUMMARY OF THE INVENTION

It is an object of the present invention to provide a charging generator apparatus capable of increasing an output current, reducing the copper loss, hence minimizing temperature rise, and operable at high efficiency.

The foregoing and other objects of the present invention have been attained by providing a charging generator apparatus which comprises a generator having armature windings and a field winding, a voltage reducing circuit for reducing the output voltage of the generator, a battery to be charged by the output voltage of the voltage reducing circuit, a voltage regulator for regulating the output of the generator by controlling a field current supplied to the field winding and a control circuit for controlling a voltage reducing ratio in the voltage reducing circuit.

DETAILED DESCRIPTION OF THE PREFERRED EMBODIMENTS

Figure 1:
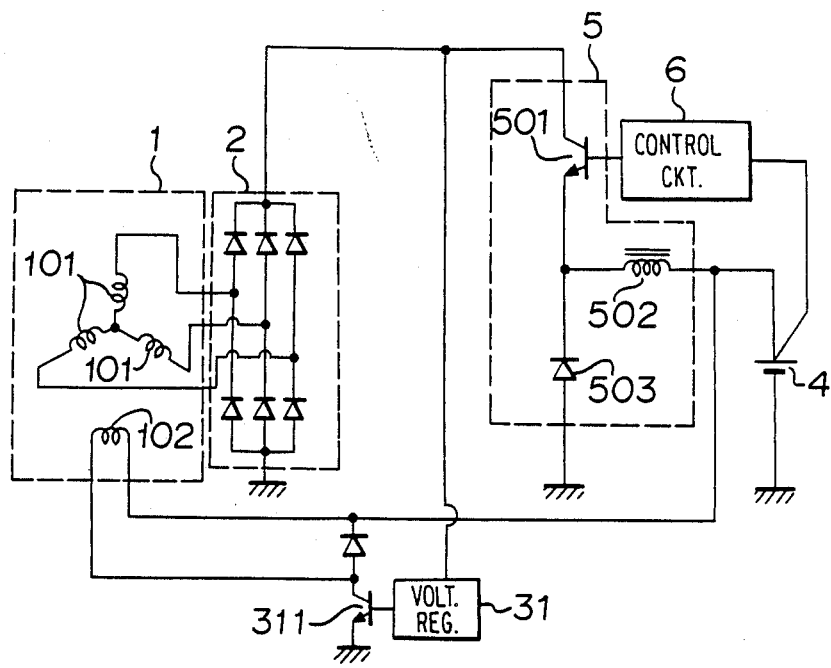
FIG. 1 is a circuit diagram of an embodiment of the charging generator apparatus according to the present invention.

Preferred embodiments of the charging generator apparatus of the present invention will be described. In FIG. 1, a reference numeral 1 designates a generator having armature windings 101 and a field winding 102, a numeral 2 designates a three-phase full-wave rectifier for rectifying the a.c. output voltage of the generator 1, a numeral 31 designates a voltage regulator which detects the output voltage of the generator 1 and controls a current flowing in the field winding 102 by turning on and off a transistor 311 to thereby control the output voltage of the generator 1 to a predetermined value $V_1$, a numeral 5 designates a voltage reducing circuit for reducing the output voltage of the generator 1, wherein the collector of an NPN transistor 501 is connected to an output terminal of the three-phase full-wave rectifier 2; the emitter is connected to the positive terminal of a battery 4 through a reactor 502; and the negative terminal of the battery 4 is connected to the emitter of the transistor 501 through the diode 503. A control circuit 6, which detects the terminal voltage of the battery 4 and performs on-off control for the transistor 501 so that the terminal voltage of the battery becomes a second predetermined value $V_2$, is connected to the base of the transistor 501. The second predetermined value $V_2$ can be determined or changed depending on the condition of a load in operation, and the battery 4 is charged in such a manner that the second predetermined value $V_2$ is smaller than the first predetermined value $V_1$ of the output voltage of the generator 1. A value of voltage drop in the voltage reducing circuit is determined by the operating voltage of the control circuit.

The operation of the charging generator apparatus having the above-mentioned construction will be described. When a field current is passed from the battery 4 through the transistor 311 to the field winding 102, and the generator 1 is actuated by the engine (not shown), a three-phase a.c. voltage is induced in the armature windings 101. The three-phase a.c. current is rectified by the three-phase full-wave rectifier 2 to be supplied to the voltage reducing circuit 5.

The operations in various kinds of mode will be described in comparison with those of the conventional apparatus.

When the output voltage of the generator 1 is lower than the second predetermined value $V_2$, the transistor 311 is turned on because the detected voltage of the voltage regulator 31 is lower than the first predetermined value $V_1$ and the field current flows at the maximum level. As the terminal voltage of the battery 4 is also lower than $V_2$, the control circuit 6 renders the conductive rate of the transistor 501 to be the maximum. However, a charging current does not flow since the terminal voltage of the battery 4 is higher than the output voltage of the generator 1. On the other hand, in the conventional apparatus, since the detected voltage of the voltage regulator 3 is lower than the predetermined value, the transistor 301 is turned on and the field current flows at the maximum level. However, a charging current does not flow because the terminal voltage of the battery 4 is higher than the output voltage of the generator 1.

When the output voltage of the generator 1 is higher than the second predetermined value $V_2$ and lower than the first predetermined value $V_1$, the transistor 311 is turned on because the detected voltage of the voltage regulator 31 is lower than $V_1$ and the field current flows at the maximum level. Since the terminal voltage of the battery 4 tends to increase to the output voltage of the generator 1, the control circuit 6 which detects the output voltage of the generator 1 adjusts the conductive rate of the transistor 501 so that the terminal voltage of the battery 4 becomes $V_2$. In this case, when the transistor 501 is in an ON state, a charging current is passed from the generator 1 through the three-phase full-wave rectifier 2, the transistor 501 and the reactor 502 to the battery 4 in order to charge it. When the transistor 501 is turned off, the electrical energy stored in the reactor 502 is supplied to the battery 4 through the diode 503 path constituted by the battery ground, the and the reactor 502. In this case, the relationships of the input voltage and the input current to the voltage reducing circuit 5 (i.e., the output voltage and the output current of the generator 1), and the output voltage and the output current of the voltage reducing circuit 5 (i.e., the charging voltage and the charging current to the battery 4) are expressed as follows: (input voltage)×(input current)=(the output voltage)×(the output current) and (the output current of the generator)=(the charging current of the battery)×(the charging voltage of the battery)/(the output voltage of the generator). In accordance with the conventional technique, the voltage regulator 3 turns on and off the transistor 301 to reduce the field current in order to maintain the output voltage of the generator 1 at a predetermined value. Accordingly, the relationships of (the output voltage of the generator)=(the charging voltage of the battery) and (the output current of the generator) =(the charging current of the battery) are respectively obtainable. Accordingly, in comparing the copper loss in the armature windings 101, the copper loss of this embodiment is (the charging voltage of the battery)$^2$/(the output voltage of the generator)$^2$ times as large as that of the conventional apparatus from the above-mentioned equation since the copper loss is in proportion to the square of the output current of the generator 1; thus the copper loss becomes smaller than the conventional apparatus.

When the output voltage of the generator 1 is higher than $V_1$, the voltage regulator 31 turns on and off the transistor 311 so as to maintain the output voltage of the generator 1 to be $V_1$, whereby the field current is controlled. The operations of the voltage reducing circuit 5 and the control circuit 6 are performed in the same manner as above so as to control the charging voltage to be $V_2$. The operation of the conventional apparatus is also performed in the same manner as above. In comparing the copper loss in the above-mentioned case, the copper loss of this embodiment is $(V_2/V_1)^2$ times as large as that of the conventional apparatus, and accordingly, the copper loss becomes smaller than the conventional apparatus.

The maximum output current at the same revolutional speed between the present invention and the conventional apparatus will be compared.

Figure 2:
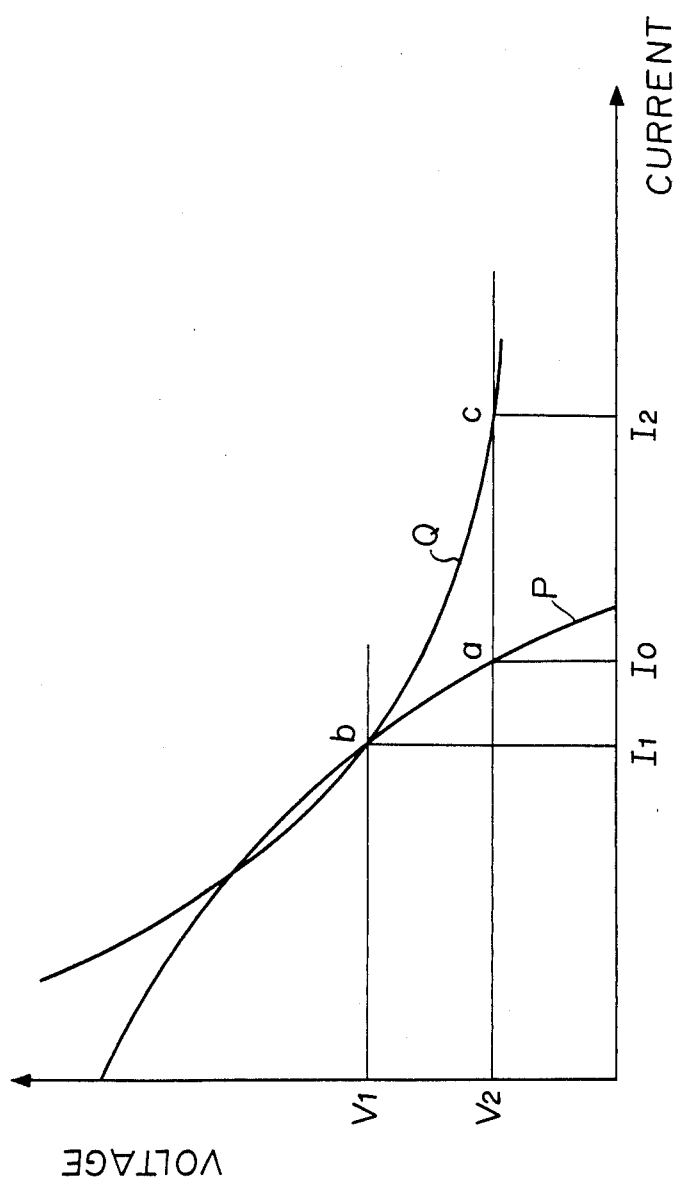
FIG. 2 is an external load characteristic diagram for illustrating the characteristic of operation of the conventional apparatus and the apparatus of the present invention.

FIG. 2 is a diagram showing external load characteristic curves wherein the ordinate represents voltage and the abscissa represents current. A curve P shows the voltage and the current produced by the generator 1 when the revolutional speed of the generator is constant and the field current is also constant (when the maximum field current is passed). In the conventional apparatus, the condition to obtain the maximum output current can be given at a point a. In this condition, the output voltage of the generator 1 is expressed by $V_2$ and the output current is expressed by I0. On the other hand, in the present invention, the value $V_1$ can be taken as the output voltage of the generator 1, as indicated at point b can be taken. Namely, the conditions the output voltage of the generator is $V_1$ and its output current is I1. In this case, i.e. with the generator operating at point b on curve P, the charging voltage is reduced to $V_2$ at point c by the voltage reducing circuit 5, and the charging current is expressed by I2=I1×(V1/V2) as described above. Accordingly, it is possible to progressively increase the output of the generator as is clear from FIG. 2. While the output of the generator can be increased, the copper loss of the armature windings 101 is $(I1/I0)^2$ times as large as that of the conventional apparatus. Namely, the copper loss of the present invention is smaller than that of the conventional apparatus. In FIG. 2, a curve Q is a hyperbola indicating (voltage) x (current)=$V_1$×I1=$V_2$×I2=constant.

Figure 3:
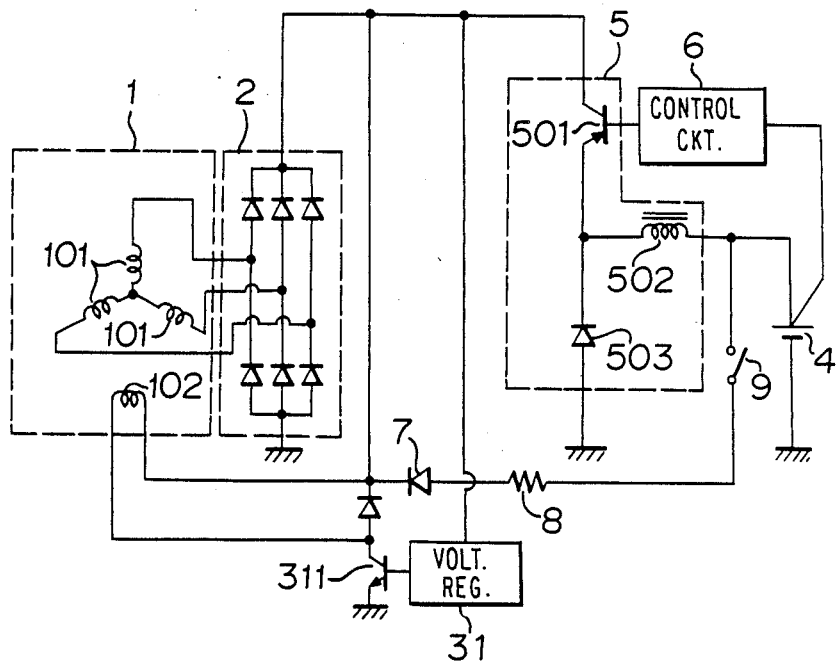
FIG. 3 is a circuit diagram of the second embodiment of the present invention.
Figure 4:
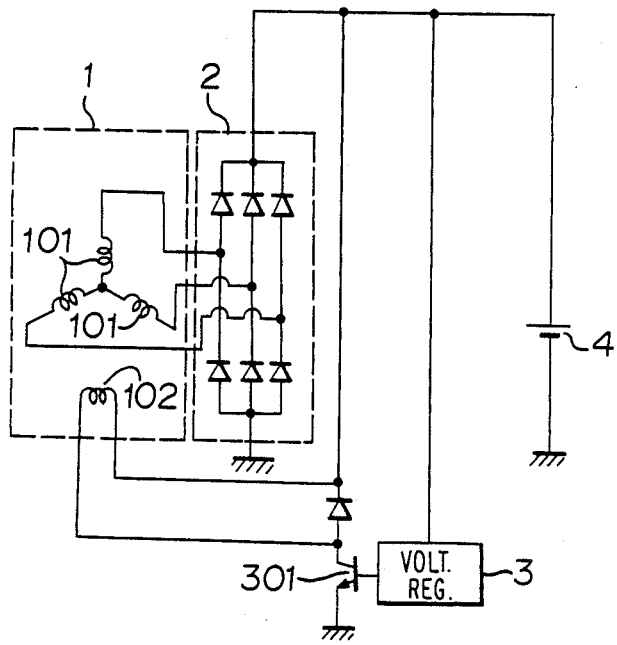
FIG. 4 is a circuit diagram of a conventional apparatus.

In the above-mentioned embodiment, the battery 4 is used for a power source for passing the field current. However, the field current can be provided by the output voltage of the generator 1 as shown in FIG. 3. Namely, it may be so constructed that when the key switch 9 is closed, a field current is passed from the battery 4 through a current limiting resistor 8, a diode 7, a field winding 102 and a transistor 311, whereby the generator 1 is actuated by an engine (not shown). When the output voltage of the generator 1 is higher than the terminal voltage of the battery 4, a field current is passed through the field winding 102 and the transistor 311 by the output voltage of the generator 1. With such construction as shown in FIG. 3, the number of turns of the field winding 102 can be increased in order to obtain the same strength of a magnetomotive force of the field winding; this requires only a small current. Accordingly, the wearing of brushes can be reduced and the capacity of current to the transistor 311 can be increased.

In the above mentioned embodiments, the NPN type transistor is used as the transistor 501 in the voltage reducing circuit 5. However, a PNP type transistor or a field effect transistor (MOS FET) may be used. Further, a multiple-chopper may be used for the voltage reducing circuit 5.

In accordance with the present invention, the voltage reducing circuit is connected to the generator to adjust a voltaging reducing ratio and a field current. Accordingly, it is possible to maintain the charging voltage to be constant and to increase an output current. Further, it is possible to control an armature current in the armature windings and to reduce the copper loss in the armature windings of the generator.

I claim:

1. A charging generator apparatus which comprises a generator having armature windings and a field winding, a voltage reducing circuit for reducing the output voltage of said generator, a battery to be charged by the output voltage of said voltage reducing circuit, a voltage regulator for regulating the output of said generator by controlling a field current supplied to said field winding and a control circuit for controlling a voltage reducing ratio in said voltage reducing circuit.

2. The charging generator apparatus according to claim 1, wherein said control circuit detects when the output voltage of said battery is at a predetermined level or lower.

3. The charging generator apparatus according to claim 2, wherein said voltage reducing circuit comprises a switching element turned on by the output of said control circuit, a reactor connected between said switching element and said battery, and a diode connected to the a function point between said switching element and said reactor so that the output of said generator is supplied to said battery through said switching element and said reactor.

4. The charging generator apparatus according to claim 1, wherein said voltage regulator maintains the output of said generator at a predetermined level by feeding a current to said field winding when the output of said generator is at a predetermined value or lower.

* * * * *